United States Patent [19]

Chen et al.

[11] Patent Number: 4,495,995
[45] Date of Patent: Jan. 29, 1985

[54] METHOD FOR PLUGGING AND SUBSEQUENT TREATMENT OF SUBTERRANEAN FORMATIONS

[75] Inventors: Hsiu Kuo Chen, Mission Viejo, Calif.; Charles P. Thomas, Littleton, Colo.

[73] Assignee: Phillips Petroleum Company, Bartlesville, Okla.

[21] Appl. No.: 150,832

[22] Filed: May 19, 1980

[51] Int. Cl.³ .................... E21B 33/138; E21B 43/22
[52] U.S. Cl. .................................. 166/273; 166/274; 166/294; 166/309
[58] Field of Search ............... 166/273, 274, 275, 294, 166/305 R, 309; 252/8.55 D

[56] References Cited

U.S. PATENT DOCUMENTS

| | | | |
|---|---|---|---|
| 3,084,743 | 4/1963 | West et al. | 166/273 |
| 3,185,634 | 5/1965 | Craig, Jr. et al. | 166/273 |
| 3,195,634 | 7/1965 | Hill | 166/309 X |
| 3,342,256 | 9/1967 | Bernard et al. | 166/273 |
| 3,376,924 | 4/1968 | Felsenthal et al. | 166/273 X |
| 3,412,793 | 11/1968 | Needham | 166/272 X |
| 3,893,511 | 7/1975 | Root | 166/274 X |
| 4,085,800 | 4/1978 | Engle et al. | 166/294 X |
| 4,088,190 | 5/1978 | Fischer et al. | 166/274 |
| 4,113,011 | 9/1978 | Bernard et al. | 166/273 |
| 4,159,037 | 6/1979 | Varnon et al. | 166/273 X |

Primary Examiner—George A. Suchfield
Attorney, Agent, or Firm—A. W. Umphlett

[57] ABSTRACT

Permeable portions of a subterranean formation are temporarily plugged by driving a foam formed by interacting an aqueous surfactant solution and dense fluid carbon dioxide into the permeable portions of the formation. In an embodiment of the invention the aqueous surfactant solution and the dense fluid carbon dioxide are introduced into the formation by sequential slug injections of the foam generating compositions. In another embodiment oil is displaced from an oil-bearing underground formation by plugging more permeable portions of the formation as described above, introducing a drive fluid into the formation and producing recovered oil and drive fluid from a well penetrating the formation.

6 Claims, No Drawings

METHOD FOR PLUGGING AND SUBSEQUENT TREATMENT OF SUBTERRANEAN FORMATIONS

BACKGROUND OF THE INVENTION

This invention relates to treatment of a hydrocarbon-containing subterranean formation. In one of its aspects this invention relates to altering the permeability of a subterranean formation. In another of its aspects this invention relates to selectively plugging the more permeable portions of a hydrocarbon-containing formation. In yet another aspect of the invention it relates to enhanced oil recovery procedures utilizing the passage of a sweep fluid through an underground formation in which the more permeable portions had been selectively plugged.

It is well known in the treatment of hydrocarbon-containing underground formations that it is important to control the flow of sweep fluids through the reservoir so that the less permeable portions of the reservoir which contain the greatest part of the residual hydrocarbon can be adequately treated for removal of these hydrocarbons. The generation in a reservoir of foam which can be driven preferentially into the more permeable strata is a recognized method for effectively sealing permeable portions of a subterranean formation thereby allowing subsequent control of the flow of treating fluid in the formation. Although a wide variety of surfactants can be combined with various fluids to generate a foam in situ in a formation those skilled in the art are always interested in combination of components that can provide a foam that has characteristics that can be tailored to specific needs.

It has now been discovered that the combination of liquid or dense phase carbon dioxide with aqueous surfactant solutions produces a foam that in comparison to the commonly used combination of aqueous surfactant solution and gaseous carbon dioxide yields relatively higher resistance factors calculated from tests in which aside from the operating temperature which determines the state of the carbon dioxide the conditions were equivalent. It is, therefore, evident that the combination of liquid or dense phase carbon dioxide with an aqueous surfactant solution can produce foams eminently suited to the plugging of the more permeable portions of underground formations.

It is therefore an object of this invention to provide a method for plugging permeable portions of underground formations. It is another object of this invention to provide a method for directing flow of sweep fluid through an underground formation. It is still another object of this invention to provide a method for treating hydrocarbon-containing underground formations.

Other aspects, objects and the various advantages of this invention will become apparent upon reading this specification and the appended claims.

STATEMENT OF THE INVENTION

According to this invention a process is provided for temporarily plugging permeable portions of a subterranean formation in which a foam formed by interacting an aqueous surfactant solution and carbon dioxide in a dense fluid phase or as a liquid is driven into the permeable portions of the formation.

In an embodiment of the invention alternate slugs of aqueous surfactant solution and dense fluid or liquid carbon dioxide are sequentially injected into an underground formation to provide generation of foam. The alternate injection of surfactant solution and liquid $CO_2$ can be continued until pressure measurement in the formation indicates the desired degree of plugging has been accomplished.

In yet another embodiment of the invention a method is provided for displacing oil from an oil bearing underground formation by first temporarily plugging the more permeable portions of an oil-bearing subterranean formation as described above and thereafter introducing into the subterranean formation a drive fluid and producing recovered oil and drive fluid from at least one additional well penetrating the subterranean formation.

The critical temperature of carbon dioxide is in the range of 89° F., i.e., carbon dioxide does not liquify at temperatures above this range regardless of the pressure. At temperatures lower than 89° F., carbon dioxide can exist either as a gas, a dense fluid, or a liquid. The fluid state below that temperature depends on the pressure applied.

In the usual operation for generating foam in oil recovery in underground reservoirs the temperature is below about 200° F. and the pressure used is in excess of 700 psi. In the miscible displacement projects considered to be of greatest value for the instant process, pressures are contemplated in the range of about 1500 to about 5000 psi and temperatures are contemplated in the range of about 50° F. to about 200° F. At these pressures even with temperatures ranging upward to 200° F. the carbon dioxide would exist as a dense fluid and in the situations with reservoir temperature below about 89° F. the carbon dioxide would exist as a liquid. Dense fluid carbon dioxide behaves more like a liquid than a gas. This can be seen from the fact that many compounds, for instance the foaming agents contemplated for this invention, are readily dispersible in a dense fluid carbon dioxide but will not disperse in gaseous carbon dioxide.

The broad range of operating pressure contemplated for this invention is in a range above 700 psi up to about 5000 psi with the preferred range of about 1500 to about 5000 psi. In its broadest aspect the invention is considered operable within those pressure ranges at temperatures up to about 200° F. with a preferred temperature range of about 50° F. to about 200° F. The carbon dioxide can be a liquid at temperatures below about 89° F., or in the operating range of about 50° F. to about 89° F., and would behave as a dense fluid between 89° F. and 200° F. with a preferred range of about 100° F. to about 200° F.

The carbon dioxide is used in conjunction with a surfactant that is introduced into the reservoir in aqueous solution. Surfactants useful in the instant process include nonionic types such as Plurofac A26 and Pluronics F68 manufactured by Wyandotte Chemical Company, alkyl phenoxy polyethoxy ethanols including Triton X-100 produced by Rohm and Haas Company, Igepal CO-990, Igepal DJ 970 and Igepal DM 730 produced by GAF Corporation, Chemical Division. Selected anionic surfactants such as COR 180 manfactured by Chemical Oil Recovery Company P.O. Box 9027, Bakersfield, CA 93309, are also suitable for use in the present process. A commercial sample of COR 180 consists of about 59.6 weight percent water (by volatization) with the following elemental analysis of the solid residue:

| Element | Wt. % |
|---|---|
| Sodium | 2.8 |
| Carbon | 50.1 |
| Hydrogen | 9.8 |
| Nitrogen | 2.2 |
| Sulfur | 5.5 |
| Oxygen | 30.0 |

Other anionic surfactants which can be used include Orvus manufactured by Procter and Gamble, alkyl aryl sulfonates including Alconox produced by Alconox, Inc., and Trend produced by Purex Corp., Ltd. Various cationic surfactants such as n-alkyltrimethylammonium chlorides including Arquad C-50 produced by Armak Company can also be used in the inventive process.

The amount of surfactant used varies depending upon the particular surfactant chosen and the nature of the reservoir oil. Generally, the larger the surfactant concentration the longer will be the life of the foam produced. The weight percent of active surfactant in the injected aqueous slug is on the order of 0.1–10 weight percent preferably 3–6 weight percent.

In miscible $CO_2$ projects, the major problem is channeling of the $CO_2$ through the reservoir resulting in by-passing most of the oil in place. The present process prevents or greatly diminishes the tendency of the $CO_2$ to channel.

The foam generated using an aqueous surfactant solution followed by liquid or dense fluid carbon dioxide has good stability under the pressures used in oil recovery processes in subterranean reservoirs. In general, elevation of the pressure increase the stability of the foam. Plugs generated by driving the foam of this invention into the more permeable portion to the reservoir will, therefore, have the ability to remain in place for extended times.

Although the foam may be generated at the surface by combining the ingredients in a foam generator and then injecting into the reservoir, or by mixing the ingredients and simultaneously injecting them into the reservoir, the preferred method of this invention is to inject sequential, alternate slugs of surfactant in aqueous solution and liquid or dense fluid carbon dioxide into the reservoir. The injection of alternate slugs of the foam constituents is continued until the desired degree of plugging is attained as evidenced by the well head injection pressure.

In further embodiments of the invention subsequent to the plugging of the more permeable portion of the subterranean formation drive fluid such as $CO_2$, thickened water, brine and the like are injected into the formation and are diverted by the foam plugs into the less permeable, relatively oil-rich zones of the formation. This improves the sweep efficiency and the total post-primary oil recovery from the formation. Subsequent treatment of the formation after forming the plugs entails the injection of the sweep fluid or drive fluid and production of recovered oil and drive fluid from at least one well penetrating the subterranean formation in addition to the well used for injection.

To show the plugging effectiveness of the present process the following example is presented which reflects the relatively higher resistance factors in the inventive liquid $CO_2$ experimental data as compared to the resistance factors in the gaseous $CO_2$ control data.

EXAMPLE I

To provide comparative resistance factors a sand pack in a controlled temperature air bath maintained at a controlled pressure by using a back-pressure regular was held at reservoir conditions of temperature and pressure. The experimental apparatus was connected so that carbon dioxide and surfactant solution could be pumped through the sand pack with discharge from the sand pack passing through a heavy walled glass cell so that the presence of foam downstream of the sand pack could be observed. Liquid flow through the apparatus was collected and measured.

A Ruska pump was used to inject liquid $CO_2$ and a controlled volume minipump was used to introduce surfactant solution into the porous medium. Two sand-packs could be interchanged: one with dimensions of 610 mm (length) and 6.2 mm (diameter) and the other measuring 610 mm (length) and 19.0 mm (diameter). The sands used were 40–60 mesh Mill Creek sand and 10–20 mesh Ottawa sand. New packing was used in each run. Heise gauges with an accuracy of ±1 psi were used to measure the pressure across the sandpacks.

In a typical procedure, sandpacks were evacuated at reduced pressure, saturated with reservoir brine and flooded with reservoir oil to residual water saturation followed by flooding with reservoir brine to residual oil saturation. Carbon dioxide was injected into the packs until only gas was produced to bring the packs to a condition simulating carbon dioxide-flooded regions. Surfactant slugs were alternated with gaseous or liquid $CO_2$ to give rise to pressure changes from which resistance factors were calculated.

Resistance factors were used as an indication of a system's potential efficiency to "foam-plug" high permeability zones. The resistance factor is the ratio of pressure drop across the sandpack during $CO_2$/surfactant flow to the pressure drop during brine flow. In general the resistance factor can be calculated by the expression:

$$RF = \frac{(Q_1/\Delta P_1)\text{Brine}}{(Q_2/\Delta P_2)\text{Surfactant} + CO_2}$$

where $Q_1$ is the brine injection rate (cc/sec) and $P_1$ is the pressure drop (psi) across the sand pack during brine flow, $Q_2$ is the $CO_2$ injection rate (cc/sec) and $P_2$ is the pressure drop (psi) across the sand pack during $CO_2$/surfactant flow. The runs using liquid $CO_2$ were carried out at 72° F. and 77° F. whereas the gaseous $CO_2$ runs were carried out at temperatures in the range of 110° F. to 118° F.

In the runs recorded and described herein, the injection rate was held constant throughout the tests at 56 cc/hour, so that at constant injection rate, the resistance factors (RF) were calculated as follows:

$$RF = \frac{\text{pressure drop across sandpack with } CO_2/\text{surfactant flow}}{\text{pressure drop across sandpack with brine flow}}$$

In order to demonstrate the greater plugging efficiency of the liquid $CO_2$ runs (Nos. 3 and 4) over the gaseous $CO_2$ runs (Nos. 1 and 2) the resistance factors at each time period throughout the runs were calculated. These values show the greater resistance to flow over a longer period of time in the liquid $CO_2$ runs. The liquid $CO_2$ runs exhibit a better resistance to the flow of $CO_2$ as shown below.

(A) Run No. 1 (gaseous $CO_2$, Temperature 115° F.) Pressure Drop (Brine Flow, 0.426 psi)

| Time (Min.) | Pressure Drop (Foam Blockage, psi) | Resistance Factor |
|---|---|---|
| 5 | 2 | 4.7 |
| 10 | 1 | 2.3 |
| 15 | 14 | 33 |
| 25 | 42 | 99 |
| 33 | 76 | 178 |
| 34.6* | 73 | 171 |
| 40 | 62 | 146 |

*First detection of gaseous $CO_2$ in the effluent stream

(B) Run No. 2 (gaseous $CO_2$, Temperature 118° F.) Pressure Drop (Brine Flow, 0.52 psi)

| Time (Min.) | Pressure Drop (Foam Blockage, psi) | Resistance Factor |
|---|---|---|
| 5 | 20 | 38 |
| 18 | 96 | 185 |
| 25 | 128 | 246 |
| 32.79* | 132 | 254 |
| 35 | 152 | 292 |
| 40 | 95 | 183 |
| 50 | 40 | 77 |

*First detection of gaseous $CO_2$ in the effluent stream

(C) Run No. 3 (Liquid $CO_2$, Temperature 77° F.) Pressure Drop (Brine Flow, 0.54 psi)

| Time (Min.) | Pressure Drop (Foam Blockage, psi) | Resistance Factor |
|---|---|---|
| 5 | 0 | 0 |
| 10 | 1 | 2 |
| 15 | 2 | 4 |
| 20 | 0 | 0 |
| 25 | 0 | 0 |
| 35 | 8 | 15 |
| 45 | 36 | 67 |
| 50 | 48 | 89 |
| 60 | 71 | 131 |
| 70 | 98 | 181 |
| 80 | 123 | 228 |
| 90 | 145 | 269 |
| 100 | 171 | 317 |
| 115 | 203 | 376 |
| 120 | 226 | 419 |
| 125 | 242 | 448 |
| 130 | 253 | 469 |
| 135 | 262 | 485 |
| 140 | 265 | 491 |
| 145 | 275 | 509 |
| 148 | 271 | 502 |
| 155 | 230 | 426 |
| 160 | 220 | 407 |
| 172 | 234 | 433 |

(D) Run No. 4 (Liquid $CO_2$, Temperature 72° F.) Pressure Drop (Brine Flow, 0.54 psi)

| Time (Min.) | Pressure Drop (Foam Blockage, psi) | Resistance Factor |
|---|---|---|
| 0 | 5 | 9 |
| 10 | 0 | 0 |
| 20 | 0 | 0 |
| 30 | 11 | 20 |
| 40 | 26 | 48 |
| 50 | 39 | 72 |
| 60 | 70 | 130 |
| 70 | 94 | 174 |
| 80 | 116 | 215 |
| 90 | 138 | 256 |
| 105 | 166 | 307 |
| 110 | 191 | 354 |
| 130 | 200 | 370 |
| 142 | 185 | 343 |

In the runs above the calculation of the resistance factor was tabulated for a time sufficient to show that the resistance factor had built to a peak and was definitely dropping off. It is apparent that in Runs 1 and 2 using gaseous $CO_2$ that the resistance factors attained did not reach the resistance factors attained in the liquid $CO_2$ Runs 3 and 4 and the liquid $CO_2$ runs showed greater resistance to flow over a longer period of time (up to 3 times as long). These higher resistance factors over a longer period of time show the superiority of the present system for plugging efficiency as compared to previously used systems using a gaseous $CO_2$ foam generation.

We claim:

1. A process for temporarily plugging permeable portions of a subterranean formation which comprises driving a composition formed by interacting aqueous surfactant solution and $CO_2$ in the form of a dense fluid or a liquid into said permeable portions of the underground formation wherein the subterranean formation is at a pressure in a range of about 700 to about 5000 psi and a temperature in a range of about 50° to about 200° F.

2. A method of claim 1 wherein the subterranean formation is at a temperature in a range of up to about 89° F. and the $CO_2$ is a liquid.

3. A method of claim 1 wherein temperature of the subterranean formation is in a range above 89° F. and the $CO_2$ is a dense fluid.

4. A method of claim 1, 2, or 3 wherein said composition formed by interacting aqueous surfactant solution and $CO_2$ is formed by introducing into said formation sequential slug injections of (1) aqueous surfactant solution and (2) $CO_2$.

5. A method for displacing oil from an oil bearing underground formation comprising:
    (a) temporarily plugging permeable portions of an oil-bearing subterranean formation by the process of claim 4,
    (b) introducing into said subterranean formation a drive fluid, and
    (c) producing recovered oil and drive fluid from at least one additional well penetrating said subterranean formation.

6. A method for displacing oil from an oil-bearing underground formation comprising:
    (a) temporarily plugging premeable portions of an oil-bearing subterranean formation by the process of claim 1,
    (b) introducing into said subterranean formation a drive fluid, and
    (c) producing recovered oil and drive fluid from at least one additional well penetrating said subterranean formation.

* * * * *